Aug. 28, 1934.    O. DIAZ    1,971,370
CAMERA
Original Filed Nov. 28, 1927    6 Sheets-Sheet 2

INVENTOR
Octaviano Diaz
BY HIS ATTORNEY
Frederick Griswold, Jr.

Aug. 28, 1934.   O. DIAZ   1,971,370
CAMERA
Original Filed Nov. 28, 1927   6 Sheets-Sheet 3

INVENTOR
Octaviano Diaz
BY HIS ATTORNEY
Frederick Griswold, Jr.

Aug. 28, 1934.   O. DIAZ   1,971,370
CAMERA
Original Filed Nov. 28, 1927   6 Sheets-Sheet 4

INVENTOR
Octaviano Diaz.
BY HIS ATTORNEY
Frederick Griswold, Jr.

Patented Aug. 28, 1934

1,971,370

UNITED STATES PATENT OFFICE 1,971,370

CAMERA

Octaviano Diaz, New York, N. Y.

Original application November 28, 1927, Serial No. 236,329. Divided and this application January 6, 1933, Serial No. 650,442. In Chile November 29, 1926

27 Claims. (Cl. 95—13)

This invention relates to cameras and has for its primary object the provision of a camera, suitable, say, for an itinerant photographer, and capable of performing all of the steps necessary to the production of a finished photograph. To this end the camera embodies within itself, as a self contained entity, all of the means whereby a sensitized surface may be exposed to form a negative, the negative developed and a positive produced therefrom and finished.

A further object of the invention is the use, in a conveniently portable camera, of a ground glass in conjunction with a magazine for a plurality of sensitized surfaces upon which negatives are to be formed whereby the ground glass may be automatically disposed behind the lens for the purpose of focusing the camera when the magazine is displaced for that purpose and the ground glass displaced when a negative is to be made, said parts being confined within the restricted space defined by the walls of the camera.

A further object of the invention is the provision, in a camera, of a magazine adapted to contain a plurality of sensitized sheets from which said sheets may be ejected in sequence to a position convenient for further manipulation and treatment.

This invention also has to do with a camera of the character described which is practical from the standpoint of ease and economy of manufacture and which shall be substantial and convenient in use and readily transportable.

These and other objects of the invention and the means for their attainment will be more apparent from the following detailed description taken in connection with the accompanying drawings illustrating one embodiment thereof whereby the invention may be practiced and in which:—

The camera in accordance with this invention performs the following functions. It may be focused upon an object and a negative image thereof formed upon a sensitized sheet, such as bromide paper, contained within a magazine. From the magazine, the exposed sheet may be ejected into a developing chamber, to which access may be had without the admission of light, where the negative may be developed and fixed in the usual manner.

In the following discussion that end 30 of the box containing the camera as a complete entity and carrying the lens for the formation of negatives will be denoted as the front of the camera and the respective sides will be denoted right and left with respect to that front, that is, as when looking from the rear to the front, and irrespective of the position of the parts in any view of the drawings.

The invention will now be described with respect to the several mechanisms combined to form the camera as a complete entity.

*The camera box or housing*

Referring particularly to Figures 1, 2, 3, 4 and 6, it will be observed that the various mechanisms are all contained within a box formed of the right and left side walls 31 and 32, respectively, and the front end wall 30 and the rear wall 33 and a bottom 34 and whereof the top is capable of being open but is closed by a hinged cover 35, which may be secured by latches 43.

The front wall 30 is solid with the exception of an aperture in which the lens unit 47 is carried, this lens unit being of any convenient commercial form desired.

The rear wall 33 may be formed with an opening 50 closed by a door 51 hinged, say, at its top as at 52, 52 and secured by any convenient latch 53, say, at the bottom. Within the hinged door 51 there is preferably formed a circular hand hole 54 carrying a sleeve 55 through which the hand may be inserted to perform the necessary operations of developing and fixing an exposed sensitized sheet within a developing chamber 56 hereinafter more fully described.

Figure 3:
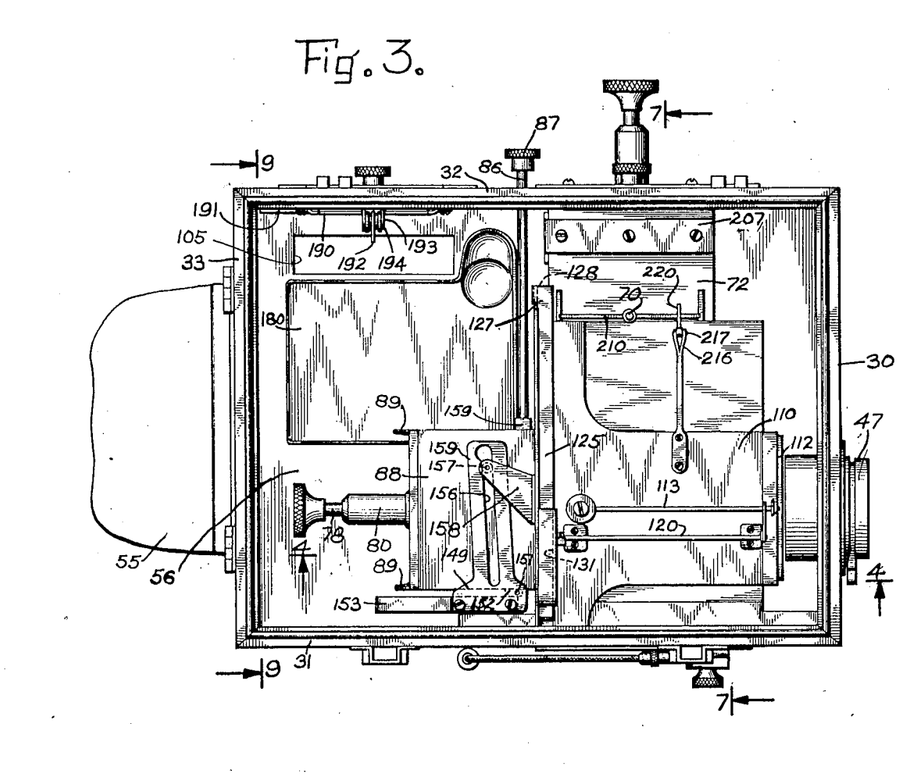
Figure 3 is a view, in plane of the camera with the cover removed to show the general disposition of parts in the interior.
Figures 4, 5:
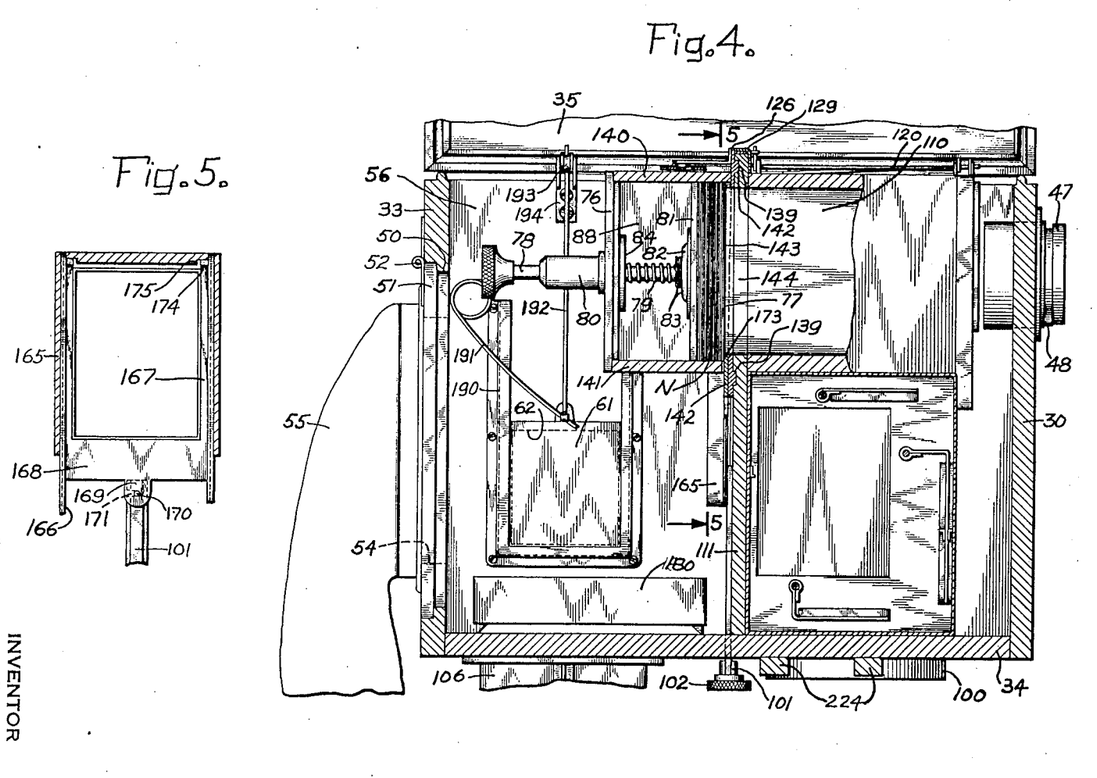
Figure 4 is a view in longitudinal vertical section taken in a plane indicated by the line 4—4 in Figure 3 and looking in the direction of the arrows and showing particularly the negative making mechanism and the developing chamber.
Figure 5 is a view in elevation showing the ejecting device for the magazine and taken in the vertical transverse plane indicated by the line 5—5 in Figure 4.
Figure 6:
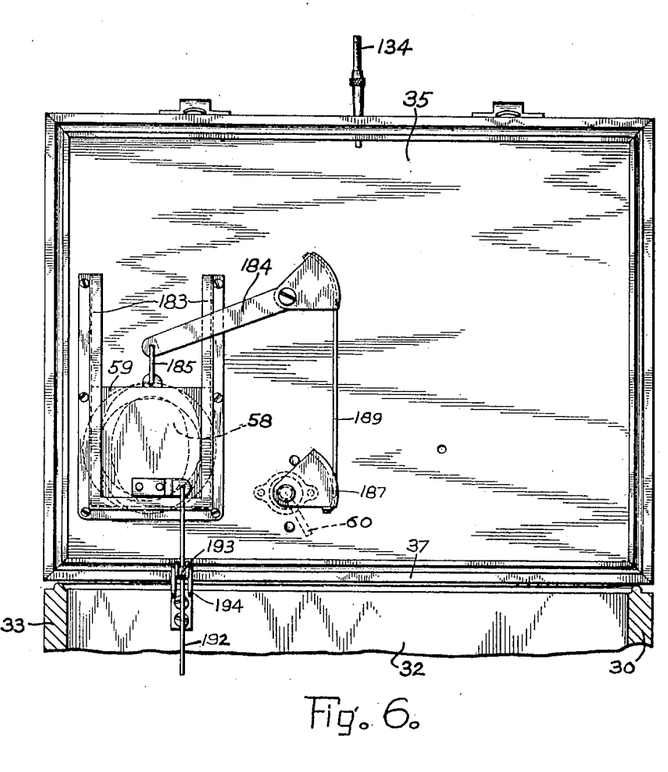
Figure 6 is a plan view of the cover, looking from below, and showing actuating devices whereby a peep-hole in the cover may be uncovered to permit examination of the interior of the working space or developing chamber.

A cover 35 of the box is formed with a peephole 58 toward the rear end through which the interior of the developing chamber 56 may be viewed when a shutter 59, Figure 6, is displaced, the shutter 59 being actuated by means of the handle 60 disposed adjacent thereto and the movement of the shutter 59 serving also to displace a shutter 61, Figure 4, from a window 62 in the left side wall 32 through which light may be admitted to the interior of the developing chamber, 56, the window 62 being closed by a suitably colored glass to prevent the admission of light rays of a color having a deleterious effect upon the exposed sensitized sheet being developed or fixed in the chamber. There is found in the top 35 a knurled knob 69 which is carried upon the outer end of an actuating rod 70, Figure 3, slidable through the top and reciprocable to actuate ejecting devices of a magazine 72 adapted to contain the sensitized sheets upon which the positive pictures are formed in the camera.

Figure 10:
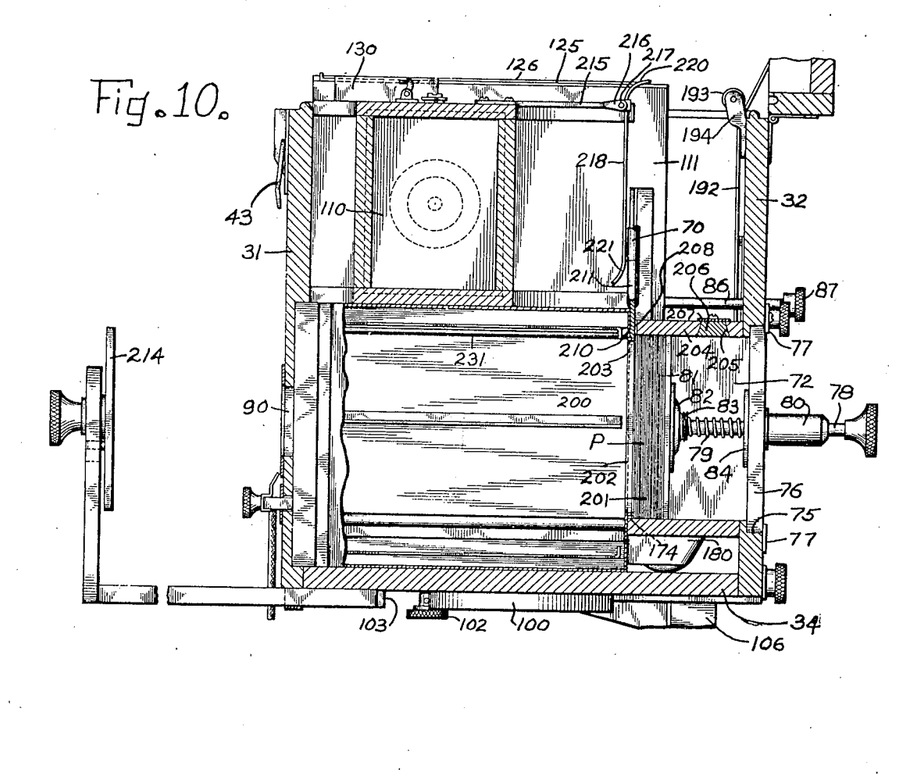
Figure 10 is a transverse vertical sectional view taken in the plane indicated by the broken line 10—10 of Figure 3 and showing particularly the mechanism whereby positive pictures are formed.

The left hand side wall 32 is shown in section in Figure 10 and from the interior of the box in Figure 4. This wall 32 is also formed with an opening 75 through which the magazine 72 for the sensitized sheets for positive images may be inserted and removed. The closure 76 for this opening is removably secured in position by the displaceable overlapping plates 77 and carries a plunger 78 pressed inwardly by the spring 79 coiled thereabout which bears at its outer end against the end of a tubular bearing 80 carried by the closure 76. The follower 81 of the magazine 72 is mounted on plunger 78 preferably by means of a pivoted or swivelling connection 82 whereby the follower 81 is angularly movable with respect to the plunger 78 for convenience in insertion and removal through the opening 75. The plunger 78 also carries, adjacent the swivelling connection 82, a male threaded part 83 adapted for engagement, when the plunger is retracted, with a correspondingly threaded female part 84 carried by the closure 76 so that when it is desired to remove the plunger and its associated parts, the plunger may be first retracted with respect to the closure and the parts 83 and 84 be caused to engage by rotation of the plunger. The follower structure may then be readily removed in convenient fashion. Through the wall 32 there also projects the magazine actuating rod 86 having at its end the knob or knurled handle 87 by which the magazine 88, for the sensitized sheets upon which negative images are formed, is displaced from behind the lens 47 whereby the focus may be obtained.

The right hand side wall 31, (Figure 1) is formed with an aperture 90 behind which the groups of lenses and shutter opening, hereinafter to be described, may be disposed and by which the formation of positive images is effected, as disclosed and claimed in my Patent No. 1,893,668 issued January 10, 1933, copending application Serial Number 236,329 filed November 28, 1927, of which this application is a division. This aperture 90 may be bordered by a metallic frame 91. The shutter actuating mechanism is not shown, but is operated from the Bowden wire 96 removably carried therewith as will be understood.

Figure 1:
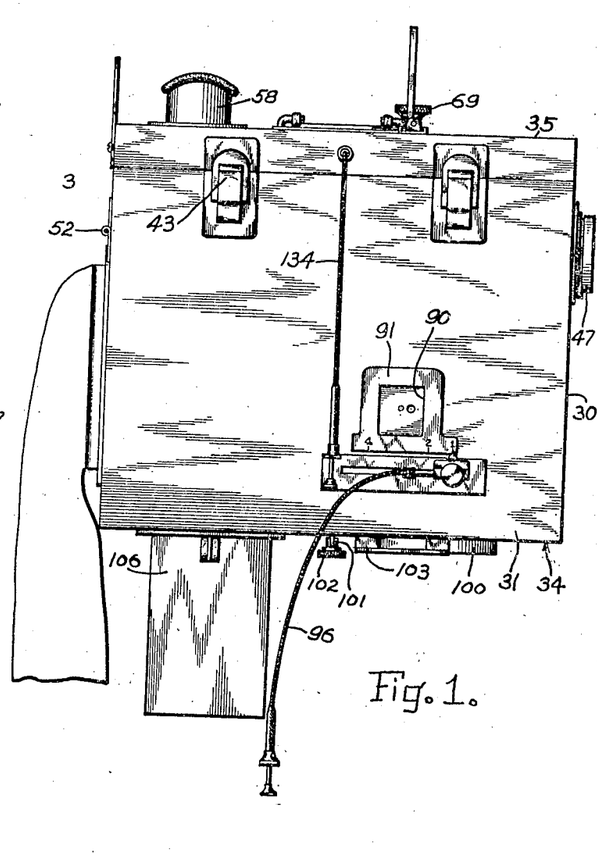
Figure 1 is a view in side elevation of the camera in accordance with this invention and showing the right hand side thereof.
Figure 2:
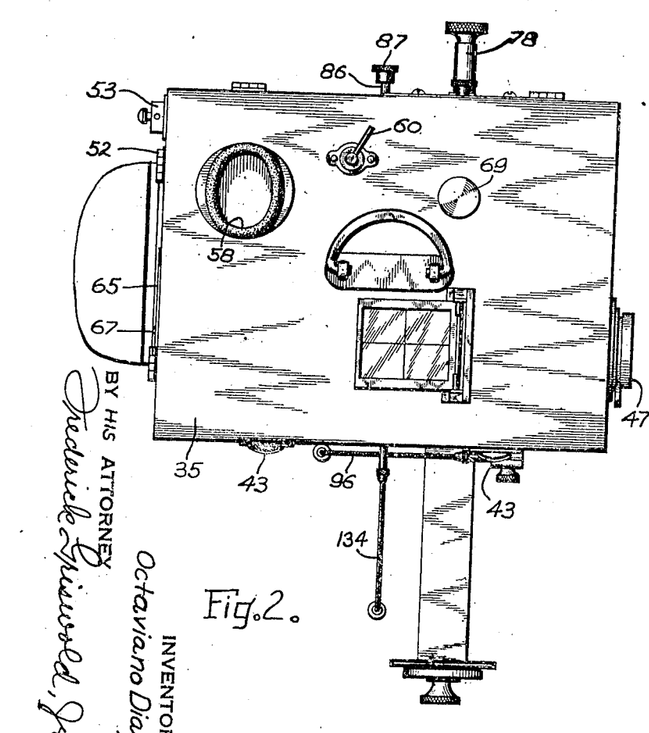
Figure 2 is a plan view of the camera, looking from above, and showing the top and cover.

Referring now to Figures 1 and 10, the devices carried with the bottom 34 of the box are shown as comprising a general cylindrical bearing 100 upon which the box may be carried on a tripod. Through the bottom there reciprocates a slide 101 having the knob 102 and by which exposed sensitized sheets may be ejected from a magazine 88, as will be hereinafter described. A bracket 103 is also carried immediately beneath the aperture 90 within which a frame 104 may telescope. This frame supports the negatives from which the positive pictures are formed, as will be hereafter more fully described. Also attached to the bottom 34 and projecting therebeneath is a fixing bath 106. This bath is accessible from within the "dark room" space 56 by means of an opening 105, Figure 3 formed therein and is removable. It may comprise a narrow, preferably rectangular, removable chamber of a size to receive one of the sensitized sheets after exposure disposed in a general vertical plane.

*The image forming mechanism*

Referring now to Figure 3, it will be observed that immediately in rear of the lens 47 is a chamber 110 of general rectangular outline. This with the lens comprises the camera proper for the making of exposed negatives. This chamber 110 is carried upon a transverse wall 111 which is of a height substantially that of the height of the interior of the box and extends from the right hand wall 31 to within a short distance of the left hand wall 32. The front end of the chamber 110 carries the shutter 112. The shutter 112 is normally retained in closed position, but is adapted to be opened to permit light to enter the chamber 110, and this may be accomplished by a suitable control mechanism, such as the flexible rod 113 actuated by the rod 120, which is revolved by Bowden wire means as is well understood.

On the rearward face of the partition 111 there is formed a strip or track 136 corresponding to the strip 126 at the top of the wall 111 and these two strips 126 and 136 serve the function of a slide upon which the magazine 88 travels.

The strips 126, 136 serve as tracks and behind these strips there are formed in the wall 111 grooves 139 adapted to receive irregularly shaped metallic slides 142 carried with the magazine 88 and adapted to reciprocate within the grooves 139 and upon the strips or tracks 126, 136.

This magazine 88 is formed of top and bottom walls 140, 141, respectively, and a removable rear wall corresponding in every particular with the closure 76, described in connection with magazine 72. For convenience, it is numbered similarly to magazine 72 and the description of that magazine applies. The magazine 88 is open at its front end, as at 143, to register with aperture 144 in the wall 111 and with the chamber 110 in front of the wall, as shown clearly in Figure 4.

The magazine 88 is disposed within the developing chamber or dark room 56 in the rear of the partition 111. Its open rear end is closed by a plate or rear wall 76 removably secured in position by the spring clips 89 on opposite sides. The follower 81 carried on the plunger 78 reciprocates in a metallic bearing 80 carried by the removable wall 76 and bears against a pack of sensitized sheets N to press the same, under the influence of the coil spring 79 coiled about the plunger 78 toward the front end of the magazine and against the opening 144 whereby the sheet n at the front of the pack N may be exposed to light rays entering through the lens and a negative formed.

Figures 7, 8:
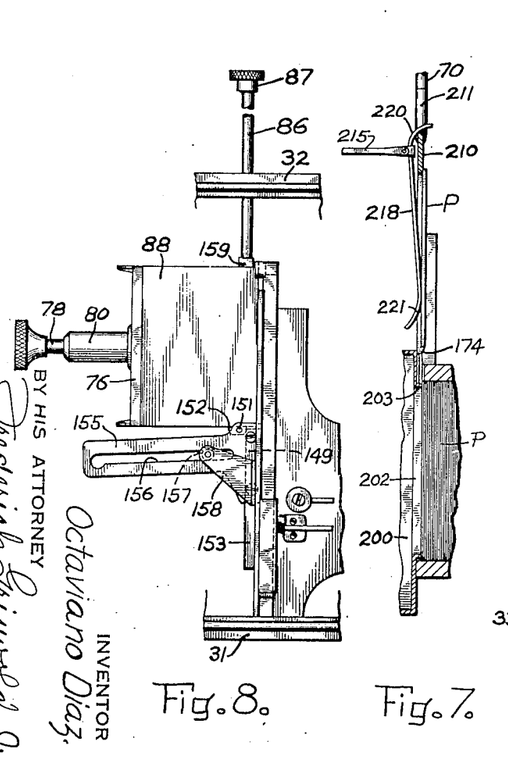
Figure 7 is a view showing the ejecting mechanism for the magazine in position whereby the sensitized sheet is fully withdrawn from the magazine and about to be acted upon by a deflecting device to flip the sheet from the ejector.
Figure 8 is a fragmentary view, looking from above, and showing in plan the magazine for sensitized sheets upon which negative images are formed, together with the ground glass plate which may be used in focusing the camera, the magazine being shown as displaced and the ground glass plate in position in contradistinction to the position of the same parts shown in Figure 3.

Referring to Figures 3 and 8, it will be observed that the magazine 88 carries on the right hand side thereof a plate 149 pivoted by means of a pivot rod 151 passing through lugs 152 carried on the side of the magazine 88. The plate 149 has secured thereto a frame 153 having a ground glass by which a focus may be made when the magazine 88 is displaced and the frame disposed before the lens 47. The pivot pin is so positioned with respect to the partition 111 as to permit the ground glass to cover the opening 144, as shown in Figure 8, when the magazine is displaced, the frame 153 pivoting from a position in parallel relationship with the partition 111, as shown in Figure 8, upon displacement of the magazine, to a position substantially perpendicular thereto and proximate and substantially parallel with the opening 144 in the side wall of the magazine.

To effect this pivotal movement of the frame 153, the plate 149 at the top is formed with an arm 155 substantially perpendicular thereto, which arm is slotted, as at 156, to receive a pin 157 carried on a bracket 158 secured on the rear face of the wall 111. Thus, when the magazine is displaced, from the position shown in Figure 3, the stationary pin 157 in the slot 156 will serve to rotate the ground glass frame 153 about its pivot to the position occupied in Figure 8.

The displacement of the magazine is readily effected by means of the rod 86 journaled in the left hand side wall 32 of the box and threaded at its extreme inner end into a nut 159 mounted upon the side wall of the magazine 88. This rod carriers the knurled head 87, previously described, on the outside of the left wall.

It will be observed that the walls of the magazine 88 are spaced from the partition 111 to permit the passage of an ejector. Formed in the wall are downwardly directed guides or tracks 165 which are formed with grooves 166 on their proximate faces, respectively, and within these grooves 166 there reciprocates the arms 167 of a generally U-shaped ejector member whereof the base 168 is formed with a tongue 169. On the front side of this tongue 169 is a pin 170 and when the magazine is in register with the lens, this pin is received within the transversely directed slot 171 formed in the end of the vertical slide 101 which reciprocates between guides 172 carried on the rear of the partition 111. The bottom and sides of the U-shaped ejector member 167–169 fit closely around the mouth of the opening 144 in the partition 111 which is shown as defined at its top and bottom by the rearwardly directed flanges 173 carried by the slides 142 carried by the magazine 88, and the side walls of this opening 144 are continuous with the flanges 173 in a vertical direction. The upper end of the arms are formed with rearwardly extending toes 174 which fit within recesses 175 formed in the top of magazine 88 and are of an effective length just sufficient to engage one sensitized sheet so that when a sheet has been exposed and it is desired to eject it, it is merely necessary to pull down the slide 101, thereby drawing down the ejector and drawing with it the exposed sheet to an accessible position within the "dark room" space 56 for convenient grasp by the hand inserted through the hand-hole 54.

In the making of a negative, a pack or stack of sensitized sheets, such as bromide paper, is inserted in the "dark room" space 56 and unwrapped therein by the hand passed through hole 54 so that no light strikes the sheets. The follower having been removed from the magazine 88, as previously described, the unwrapped pack N is then inserted in the magazine and the follower placed in position and released so that the spring 79 may feed the pack N forward against the opening 144.

Figure 9:
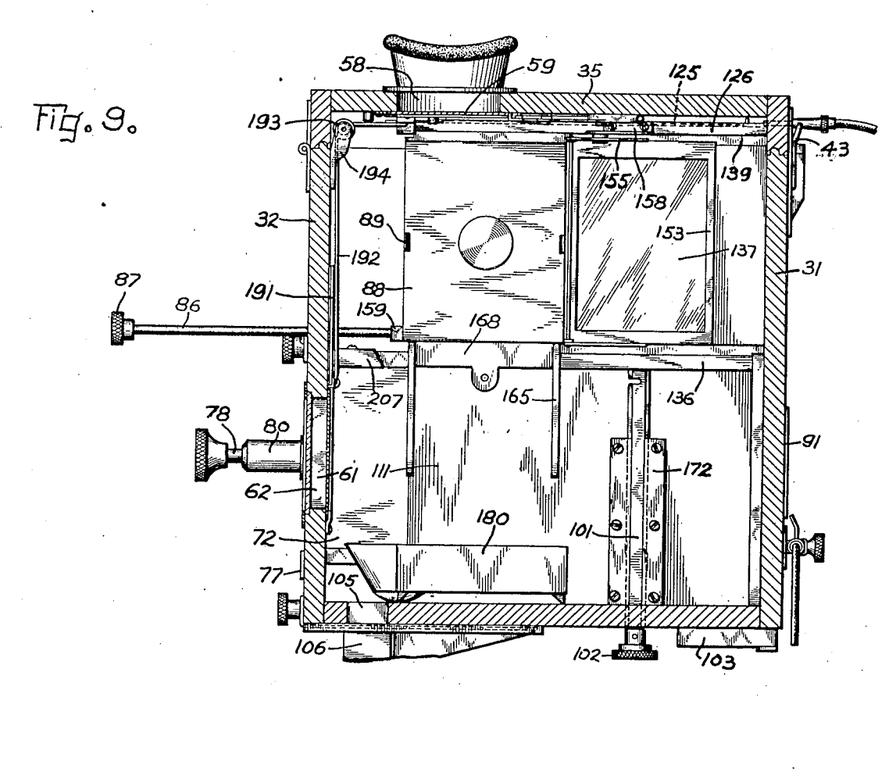
Figure 9 is a transverse vertical sectional view taken in the plane indicated by the line 9—9 in Figure 3 and looking in the direction of the arrows, and showing particularly the magazine and the ground glass in position for focusing the camera.

To focus the camera, the magazine 88 is displaced from behind the lens to the position shown in Figure 9 by withdrawing the rod 86 toward the left. This movement of the magazine has previously been described, and by it the ground glass plate 137 is swung in front of the aperture 144 in the partition 111. Since the opening in the magazine lies against the partition 111, as shown in Figure 8, and may be suitably sealed thereabout, the rear wall 33 of the box may be opened and the image formed on the ground glass plate will be plainly visible. The lens may be then adjusted in usual manner to focus the image upon the ground glass plate. Thereafter the door in the rear wall is closed again, the knurled head may be pushed inwardly to slide the magazine to the right in register with the lens. At this time, of course, the pin 170 on the ejector is carried into the slot 171 in the ejecting slide 101 which, of course, remains stationary so far as movement of the magazine is concerned. To make the negative, the shutter is operated in the usual manner. After the sensitized sheet n has been exposed and in order to develop the negative, the slide 101 may be retracted in a downward direction by grasping the knurled head 102 from without the box and since the pin 170 on the ejecting head 168 is disposed within the slot 171 in the slide, the ejector will be drawn downwardly, and the toes 174 engaging the top of the exposed sheet will draw that sheet down to a point below the magazine 88 where it is accessible from the developing chamber 56. The sheet may then be grasped by the hand passing through the opening 54, and the necessary steps of developing and fixing carried out within the "dark room" space 56. An additional container for the necessary washing fluids is shown at 180. In order that the photographer may see what he is doing and note the progress of the development of the sheet, the slide 59 in the cover 35 may be withdrawn from the peep-hole 58. However, this may be done only after the precaution has been observed of placing the eye over the peep-hole so that all light is excluded therefrom.

The peep-hole 58 is normally closed by the slide or closure 59 which reciprocates within the frame 183 on the inner side of the cover 35, the reciprocation in one direction being effected by a lever 184 pivoted on the inner side of the cover 35 to which the slide is attached by means of a link 185. The other end of lever 184 is formed with a quadrant and a similar quadrant 187 is rotated by the arm 60, the two being connected by a flexible link 189.

Light may be admitted within the developing chamber by means of the window 62 in the left hand wall, heretofore referred to. This window, containing a suitable colored glass is normally closed by a slide 61 which reciprocates within the frame 190 and is normally pressed downwardly to cover the window by the spring 191. The slide 61 is raised to uncover the window and permit the admission of suitably filtered light by a flexible link 192 connected thereto passing over a roller 193 mounted on bracket 194 carried with the side wall and is connected with the slide 59 covering the peep-hole 58 so that when the peep-hole is uncovered, the slide covering the window is automatically raised and light is admitted and vice versa.

Positive making mechanism

After the negative has been properly developed, it may conveniently be removed by detaching the tank 106 from the bottom 34 of the box, and picking out the negative, and positive photographs may then be made therefrom. These positives are also formed upon sensitized sheets, such as bromide paper, and the sheets are also preferably utilized from a stack thereon in a magazine, which is in all respects similar to the magazine 88 heretofore described.

Referring first to Figure 10, it will be noted that in front of the partition 111 and below the previously described camera proper including lens 47 there is formed a chamber 200 for the passage for light rays between the aperture 90 in the right wall 32 of the box, whereby a lens is rendered effective, and a sensitized sheet P which may also be bromide paper. A pack P of such sheets may be disposed in a magazine 201, which is substantially similar in every respect to that heretofore described and contains the spring pressed plunger 78 as previously described. As distinguished from magazine 88, the magazine 201 is stationary and is supported in any convenient fashion adjacent the wall of the chamber 200 and proximate the aperture 202 formed in the wall 200.

Positive images are formed by placing a previously obtained negative in a frame 214 and admitting light therefrom onto the sensitized sheets P through the aperture 90.

The chamber 200 may be formed conveniently of pressed metal and the opening against which the sheet of sensitized paper is disposed for the reproduction of the image may be formed by turning outwardly a portion of the wall as at 203 to form the aperture 202. In the top wall 204 of the magazine 201 there is formed an opening 205 of generally rectangular shape through which the pack P of the sensitized sheets may be inserted when the plunger is withdrawn to the extreme outer position, it being preferably locked in that position as has been described. The opening is closed by a sliding wall section 206 having tapering edges to cooperate with the similarly shaped edges of the top wall 204 and carries at its top a sheet of metal 207 to overlie the adjacent portions of the top and thus support the sliding closure in position. Adjacent the chamber 200, the top wall 204 is cut away slightly as at 208 to permit the passage of an ejector 210 substantially similar to that heretofore described. That is, the ejector comprises a U-shaped frame 167—168 inserted in this instance so that it is the bottom wall of the magazine which is cut away, as at 210, to receive the toes 174 which engage one sheet. In this instance, however, the base member 168 carries a threaded lug 211 to receive the threaded end of the ejector rod 70, and as the ejector is reversed in position, the sheet is drawn upwardly through the slot 208. Above the chamber 200 and on top of the camera chamber 110 there is carried a bracket 215 bifurcated at its end 216 and apertured to carry a pivot 217 on the end of a curved ejector finger 218. This ejector 218 may take the form of a curved wire which, above the pivot 217, is curved, as at 220, toward the left wall of the box so as to lie in the path of the ejector as it is raised and when the ejector is raised and strikes this curved end 220, the deflector is swung toward the left side of the camera so that the lower end 221 which is reversely bent or directed toward the right hand wall of the camera will strike the sensitized exposed sheet and flip it out of the ejector into the space adjacent the left hand wall, where it may be readily grasped by the hand inserted through the hand hole 54 and subjected to the necessary baths in the developing chamber 56.

The lens and shutter are contained within a metallic casing indicated at 240 in Figure 10. This casing 240 forms the right hand wall of the chamber 200.

It is believed that the operation of the picture making mechanism forming the subject matter of this invention will be apparent from the foregoing description. Within the box 30—35 everything necessary to the making of a finished positive photograph is contained and thus the box may be conveniently carried about, say, by an itinerate photographer in plying his trade.

When the subject is to be photographed, the box 30—35 is set up on a tripod by securing the tripod to the table 100. An exact focus of the lens 47 may be obtained, for the purpose of making a negative, by pulling out on the knob 87 to move the magazine 88 away from the front of the lens 47 and swing the ground glass into the focus of the lens. Upon opening the door 51 in the rear wall 33, the photographer may see the image on the ground glass and make the necessary adjustments. The magazine is, of course, then returned to position behind the lens by pushing the rod 86 in again.

Before or after focusing, a pack of sensitized sheets N, wrapped against the deleterious effects of light, is inserted in the developing chamber 56 and unwrapped by the hand inserted through the opening 54, which is sealed against the admission of light therein by the sleeve 55 surrounding the photographer's arm.

The magazine 88 is opened to receive the unwrapped pack N by disengaging the spring clips 89 and removing the rear wall 76 and with it, of course, the follower 81 and associated mechanism. After their removal and the insertion of the pack N, the follower 81 is again inserted and the rear wall made fast by the spring clips 89.

The negative n is then made by actuating the shutter. It is then ejected from the magazine 88 by drawing down the knob 102 which brings down the ejector 167, 169 into the space 56 below the magazine 88 and the toes 174 carry with it the exposed negative which may then be easily grasped by the photographer's hand, inserted through the hand hole 54 and developed within the space 56. It may then be removed for the purpose of making one or more positives therefrom.

More negatives may be, of course, made at once, until the supply of sensitized sheets n in the magazine 88 is exhausted. It is to be noted that the magazines are each capable of accommodating a great many sensitized sheets. In the preferred embodiment, a hundred may be accommodated.

To make positives p from the negative n, the negative n is set in the carrier 214 in front of the opening 90 in the right hand wall 31.

After a positive is focused the photographer may eject the exposed sheet p from magazine 201 by drawing up on the knob 69, which causes the movement of ejector 208 out of the magazine 201 to a position thereabove. The upward movement of the ejector 208 actuates the ejector finger 218 to flip the exposed positive p out of the ejector frame 208 within easy grasp of the photographer's hand inserted through hand hole 54 as before, and, as before, the positive p is developed and fixed in the chamber 56. Of course, any number of positives may be made from the same or different negatives limited only by the number of sensitized sheets in the magazine 201.

Various modifications will occur to those skilled in the art in the form taken by the various instrumentalities going to make up the picture taking device as well as in the composition thereof. Certain of these instrumentalities are capable of independent use as well as use in combination with certain or all of the others and no limitation is intended by the phraseology used in the foregoing description or illustrations in the accompanying drawings, except as set forth in the appended claims.

What is claimed is:—

1. A photographing device comprising a box, a transverse partition in the box defining a camera receiving space on the front side thereof and a developing space on the rear side thereof, a lens in the upper right hand quarter of the front wall, said partition being formed with an opening in register with the lens, a magazine carried with the partition and slidable on the rear face thereof into register with the opening, means to eject an exposed sensitized sheet from the magazine into the developing space, an opening formed in the right wall of the box forwardly of the partition, a magazine within the camera space in operative relation with respect to the last named opening, sliding means reciprocable on the inner side of the right wall adjacent the opening, a plurality of groups of lenses carried with the sliding means, means to reciprocate said sliding means to selectively bring the respective groups of lenses in register with the opening, and means to eject an exposed sensitized sheet from the last named magazine.

2. A photographing device comprising a box, a transverse partition in the box defining a camera receiving space on the front side thereof and a developing space on the rear side thereof, a lens in the upper right hand quarter of the front wall, said partition being formed with an opening in register with the lens, means to support a sensitized sheet carried with the partition and slidable on the rear face thereof in register with the opening, means to eject an exposed sensitized sheet from said means into the developing space, an opening formed in the right wall of the box forwardly of the partition, means to support a sensitized sheet within the camera space in operative relation with respect to the last named opening, sliding means reciprocable on the inner side of the right wall adjacent the opening, a plurality of groups of lenses carried with the sliding means, means to reciprocate said sliding means to bring the respective group of lenses in register with the opening and means to eject an exposed sensitized sheet from the last named means.

3. A photographing device comprising a box, a transverse partition in the box defining a camera receiving space on the front side thereof and a developing space on the rear side thereof, a lens in the upper right hand quarter of the front wall, said partition being formed with an opening in register with the lens, a magazine carried with the partition and slidable on the rear face thereof in register with the opening, an ejector to transfer an exposed sensitized sheet from the magazine into the developing space, an opening formed in the right wall of the box forwardly of the partition, a magazine within the camera space in operative relation with respect to the last named opening, sliding means reciprocable on the inner side of the right wall adjacent the opening, a plurality of groups of lenses carried with the sliding means, means to reciprocate said sliding means to bring the respective group of lenses in register with the opening, a plurality of partitions within the camera space, operative connections between the partitions and said sliding means whereby the camera space between the last named magazine and the last named opening is subdivided in accordance with the number of lenses brought into register with the opening, means to eject an exposed sensitized sheet from the last named magazine and supporting means for a negative in front of the last named opening.

4. In a device of the character described, a box, a transverse member therein defining a developing chamber within the box, a camera within the box on that side of the member opposite to the developing chamber, a magazine for sensitized sheets movably carried by the member in the developing chamber and movable therein from a position in register with the camera to a position out of register therewith and means to eject a sheet from the magazine into the developing chamber.

5. In a device of the character described, a box, a transverse member therein defining a developing chamber within the box, a camera within the box on that side of the member opposite to the developing chamber, a magazine for sensitized sheets movably carried by the member in the developing chamber and movable therein from a position in register with the camera to a position out of register therewith and means operative from without the box to eject a sheet from the magazine into the developing chamber when said magazine is in register with the camera.

6. In a device of the character described, a box, a transverse member therein defining a developing chamber within the box, a camera within the box on that side of the member opposite to the developing chamber, a magazine for sensitized sheets movably carried by the member in the developing chamber and movable therein from a position in register with the camera to a position out of register therewith, means to eject a sheet from the magazine into the developing chamber and enabling means to develop the sheet within the chamber.

7. In a device of the character described, a box, a transverse member therein defining a developing chamber within the box, a camera within the box on that side of the member opposite to the developing chamber, a magazine for sensitized sheets movably carried by the member in the developing chamber and movable therein from a position in register with the camera to a position out of register therewith, means operative from without the box to eject a sheet from the magazine into the developing chamber, and means rendering the development of the sheet visible from without the box.

8. In a device of the character described, a box, a transverse member therein defining a developing chamber within the box, a camera within the box on that side of the member opposite to the developing chamber, a magazine for sensitized sheets movably carried by the member in the developing chamber and movable therein from a position in register with the camera to a position out of register therewith.

9. In a device of the character described, a box, a transverse member therein defining a developing chamber within the box, a camera within the box on that side of the member opposite to the developing chamber, a magazine for sensitized sheets movably carried by the member in the developing chamber and movable therein from a position in register with the camera to a position out of register therewith, a frame for a focusing screen pivoted with respect to the magazine and means to displace the magazine from behind the camera and to automatically move the frame therebehind.

10. In a device of the character described, a box, a transverse member therein defining a developing chamber within the box, a camera within the box on that side of the member opposite to the developing chamber, a magazine for sensitized sheets movably carried by the member in the developing chamber and movable therein from a position in register with the camera to a position out of register therewith, a frame for a ground glass carried with the magazine and means operative from without the box to displace the magazine from behind the camera lens and to automatically move the ground glass therebehind.

11. In a device of the character described, a box, a transverse member therein defining a developing chamber within the box, a camera within the box on that sde of the member opposite to the developing chamber, a magazine for sensitized sheets movably carried by the member in the developing chamber and movable therein from a position in register with the camera to a position out of register therewith, a frame for a ground glass carried with the magazine, means operative from without the box to displace the magazine from behind the camera lens and to automatically move the ground glass therebehind, means to eject a sheet from the magazine and means operative from without the box and effective when the magazine is behind the lens to actuate the ejecting means.

12. In a device of the character described, a box, a lens, a transverse partition within the box formed with an opening in register with the lens and defining a developing chamber within the box on the side opposite to the lens and a magazine slidable on the partition within the box on the side opposite to the lens and movable into and out of register with the opening in the partition.

13. In a device of the character described, a box, a transverse member therein defining a developing chamber within the box, a camera within the box on that side of the member opposite to the developing chamber, a magazine for sensitized sheets movably carried by the member in the developing chamber and movable therein from a position in register with the camera to a position out of register therewith and means operable from without the box to move the magazine into and out of register with the opening in the partition.

14. In a device of the character described, a box, a transverse member therein defining a developing chamber within the box, a camera within the box on that side of the member opposite to the developing chamber, a magazine for sensitized sheets movably carried by the member in the developing chamber and movable therein from a position in register with the camera to a position out of register therewith, a frame for a ground glass pivoted on the magazine and operative connections between the frame and partition to move the frame from a perpendicular to a parallel position with respect to the partition.

15. In a device of the character described, a box, a lens, a transverse partition within the box formed with an opening in register with the lens and defining a developing chamber within the box on the side opposite to the lens, a magazine slidable on the rear face of the partition within the box on the side opposite to the lens and movable into and out of register with the opening therein, a frame for the ground glass pivoted on the magazine, operative connections between the frame and partition to move the frame from a perpendicular to a parallel position with respect to the partition and means operative from without the box to move the magazine.

16. In a device of the character described, a wall formed with an opening, a magazine for sensitized sheets adapted to register with the opening, guides carried with opposed sides of said magazine proximate the wall, a substantially U-shaped member adapted to reciprocate in said guides, a passage formed between the magazine and wall through which the U-shaped member reciprocates, means carried with the ends of the arms of the U-shaped member to engage an edge of a sensitized sheet and means to reciprocate the U-shaped member to eject a sensitized sheet from the magazine through the passage.

17. In a device of the character described, a wall formed with an opening, a magazine for sensitized sheets adapted to register with the opening, ejector means reciprocable in a plane parallel with the sensitized sheets and with respect to the magazine and means carried with the ejector means to engage an edge of a sensitized sheet to eject a sheet from the magazine.

18. In a device of the character described, a wall formed with an opening, a magazine for sensitized sheets movable on the wall and adapted to register with the opening in one position of its movement, guides carries with opposed sides of said magazine proximate the wall, a substantially U-shaped member adapted to reciprocate in said guides, a passage formed between the magazine and wall through which the U-shaped member reciprocates, means carried with the ends of the arms of the U-shaped member to engage an edge of a sensitized sheet, reciprocating means proximate the opening to reciprocate the U-shaped member to eject a sensitized sheet from the magazine through the passage and interengaging means between the U-shaped member and the reciprocating means.

19. In a device of the character described, a wall formed with an opening, a magazine for sensitized sheets adapted to register with the opening, ejector means reciprocable in a plane parallel with the sensitized sheets and with respect to the magazine, means carried with the ejector means to engage an edge of a sensitized sheet to eject a sheet from the magazine, a removable wall at the rear of the magazine, a plunger reciprocable therein, a follower within the magazine and yielding means to urge the follower toward the opening.

20. In a device of the character described, a wall formed with an opening, a magazine for sensitized sheets adapted to register with the opening, a removable wall at the rear of the magazine, a plunger reciprocable therein, a follower within the magazine, yielding means to urge the follower toward the opening, guides carried with opposed sides of said magazine proximate the wall, a substantially U-shaped member adapted to reciprocate in said guides, a passage formed between the magazine and wall through which the U-shaped member reciprocates, means carried with the ends of the arms of the U-shaped member to engage an edge of a sensitized sheet and means to reciprocate the U-shaped member to eject a sensitized sheet from the magazine through the passage.

21. In a device of the character described, a wall formed with an opening, a magazine for sensitized sheets adapted to register with the opening, ejector means reciprocable in a plane parallel with the sensitized sheets and with respect to the magazine, means carried with the ejector means to engage an edge of a sensitized sheet to eject a sheet from the magazine, a removable wall at the rear of the magazine, a plunger reciprocable therein, a follower within the magazine, a swivelling connection between the plunger and the follower and yielding means to urge the follower toward the opening.

22. In a device of the character described, a wall formed with an opening, a magazine for sensitized sheets adapted to register with the opening, ejector means reciprocable in a plane parallel with the sensitized sheets and with respect to the magazine, means carried with the ejector means to engage an edge of a sensitized sheet to eject a sheet from the magazine, a removable wall at the rear of the magazine, a plunger reciprocable therein, a follower within the magazine, means carried with the rear wall to engage the follower in retracted position and yielding means to urge the follower toward the opening.

23. In a device of the character described, a wall formed with an opening, a magazine for sensitized sheets adapted to register with the opening, ejector means reciprocable in a plane parallel with the sensitized sheets and with respect to the magazine, means carried with the ejector means to engage an edge of a sensitized sheet to eject a sheet from the magazine, a removable wall at the rear of the magazine, a plunger reciprocable therein, a follower within the magazine, a swivelling connection between the plunger and the follower, means carried with the rear wall to engage the follower in retracted position and yielding means to urge the follower toward the opening.

24. In a device of the character described, a wall formed with an opening, a magazine for sensitized sheets adapted to register with the opening, guides carried with opposed sides of said magazine proximate the wall, a substantially U-shaped member adapted to reciprocate in said guides, a passage formed between the magazine and wall through which the U-shaped member reciprocates, means carried with the ends of the arms of the U-shaped member to engage an edge of a sensitized sheet, means to reciprocate the U-shaped member to eject a sensitized sheet from the magazine through the passage and means to deflect a sensitized sheet out of the ejecting means.

25. In a device of the character described, a wall formed with an opening, a magazine for sensitized sheets adapted to register with the opening, ejector means reciprocable in a plane parallel with the sensitized sheets and with respect to the magazine, means carried with the ejector means to engage an edge of a sensitized sheet to eject a sheet from the magazine and means to deflect a sensitized sheet out of the ejecting means.

26. In a device of the character described, a magazine for sensitized sheets comprising a removable closure for the rear of the magazine, a plunger reciprocable through the closure, a spring normally urging the plunger inwardly, a follower in the magazine, a swivelling connection between the follower and the plunger, threads formed on the swivelling connection and a female threaded part carried by the closer to receive said first named threads.

27. In a device of the character described, a box, a wall therein formed with an opening, a track on the wall, a magazine reciprocable on the track comprising a rectangular four sided container spaced from the wall and framing the opening in one position of its movement, parallel guides formed with grooves in proximate faces carried with the magazine, a U-shaped ejector slidable in the grooves and formed in its base with a tongue carrying a pin and at the ends of its arms with rearwardly extending toes adapted to overlie an edge of a sheet in the magazine, guiding means carried with the wall proximate the opening, and an actuating slide reciprocable in the guiding means formed with a slot to receive the pin on the ejector.

OCTAVIANO DIAZ.